United States Patent
Song et al.

(10) Patent No.: US 8,659,394 B2
(45) Date of Patent: Feb. 25, 2014

(54) RFID TAG AND METHOD RECEIVING RFID TAG SIGNAL

(75) Inventors: Il-jong Song, Yongin-si (KR); Byeong-hoon Lee, Seoul (KR); Seung-won Lee, Yongin-si (KR); Chul-joon Choi, Suwon-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 471 days.

(21) Appl. No.: 13/093,254

(22) Filed: Apr. 25, 2011

(65) Prior Publication Data
US 2011/0316673 A1  Dec. 29, 2011

(30) Foreign Application Priority Data

Jun. 25, 2010  (KR) .................. 10-2010-0060818

(51) Int. Cl.
*H04Q 5/22* (2006.01)
*H04L 5/12* (2006.01)
*H03D 3/02* (2006.01)

(52) U.S. Cl.
USPC ......... 340/10.1; 340/10.34; 375/265; 329/73; 329/335

(58) Field of Classification Search
None
See application file for complete search history.

(56) References Cited

U.S. PATENT DOCUMENTS

| 4,477,770 A * | 10/1984 | Tojo .............................. 324/613 |
| 6,539,062 B1 * | 3/2003 | Grabb et al. .................. 375/261 |
| 6,586,988 B2 | 7/2003 | Arisawa |
| 6,636,119 B2 | 10/2003 | Vathulya |
| 6,784,744 B2 | 8/2004 | Tichauer |
| 7,269,395 B2 * | 9/2007 | Choi et al. ................. 455/115.3 |
| 7,417,496 B2 | 8/2008 | Kang et al. |
| 7,579,906 B2 | 8/2009 | Kumar et al. |
| 7,804,915 B2 * | 9/2010 | Huang et al. .................. 375/296 |
| 8,344,878 B2 * | 1/2013 | Goldman et al. ........ 340/539.13 |
| 2005/0041533 A1 * | 2/2005 | Fujisawa et al. ................ 368/47 |
| 2005/0232068 A1 * | 10/2005 | Kubo .......................... 365/233.5 |
| 2005/0242790 A1 * | 11/2005 | Kofler ............................ 323/234 |
| 2008/0080214 A1 * | 4/2008 | Umeda et al. .................... 363/37 |
| 2010/0231293 A1 * | 9/2010 | Cho et al. ....................... 329/347 |

FOREIGN PATENT DOCUMENTS

| JP | 10285087 A | 10/1998 |
| JP | 11220338 A | 8/1999 |
| JP | 2004516737 A | 6/2004 |
| JP | 2006180469 A | 7/2006 |
| JP | 2007043699 A | 2/2007 |
| KR | 1020030010581 A | 2/2003 |
| KR | 1020050106922 A | 11/2005 |
| KR | 100720227 B1 | 5/2007 |
| KR | 1020070059862 A | 6/2007 |
| WO | 0250996 A2 | 6/2002 |

* cited by examiner

*Primary Examiner* — George Bugg
*Assistant Examiner* — Munear Akki
(74) *Attorney, Agent, or Firm* — Volentine & Whitt, PLLC

(57) ABSTRACT

Provided are a Radio Frequency IDentification (RFID) tag with a signal reception method. The RFID tag includes a demodulator that receives a read signal containing read data. The demodulator includes; a voltage generating circuit that provides a first voltage signal and a second voltage signal derived from the received read signal, an inverter that provides a data pulse signal indicative of the read data by inverting the second voltage signal using an inverting voltage defined in relation to the first voltage signal, and a buffer that recovers the read data by buffering the data pulse signal.

20 Claims, 8 Drawing Sheets

RFID TAG AND METHOD RECEIVING RFID TAG SIGNAL

CROSS-REFERENCE TO RELATED APPLICATIONS

This U.S. non-provisional patent application claims priority under 35 U.S.C. §119 to Korean Patent Application No. 10-2010-0060818 filed on Jun. 25, 2010, the subject matter of which is hereby incorporated by reference.

BACKGROUND OF THE INVENTION

The present disclosure relates to Radio Frequency IDentification (RFID) tags and systems using RFID tags. More particularly, the disclosure relates to RFID tags having improved signal reception performance and methods of receiving RFID tag signals.

RFID technology has been used for many years to communicate identification information via radio waves. In general, a RFID system includes a RFID reader and one or more RFID tag(s). The RFID reader may be connected to a range of information processing devices (e.g., a computer) capable of receiving and processing data related to the identification information provided by a RFID tag. The RFID uses a sequence of control signals to facilitate the receipt (reading) and/or transmission (writing) of identification information to/from reader a RFID tag.

Because the RFID tag communicates with the RFID reader in a noncontact manner, the RFID tag may not receive a control signal having sufficient strength due to separation between the RFID tag and RFID reader, the presence of an intervening obstacle, etc. That is, performance of the RFID system is seriously degraded when signals communicated between the RFID tag and the RFID reader are weak and/or intermittent.

SUMMARY OF THE INVENTION

Embodiments of the inventive concept provide RFID tags and related methods of receiving RFID tag signal(s). RFID systems designed and operated in accordance with embodiments of the inventive concept suffer from considerably less performance degradation due to weak or intermittent signal(s).

Certain embodiments of the inventive concept provide a Radio Frequency IDentification (RFID) tag comprising a demodulator that receives a read signal containing read data. The demodulator comprises; a voltage generating circuit that provides a first voltage signal and a second voltage signal derived from the received read signal, an inverter that provides a data pulse signal indicative of the read data by inverting the second voltage signal using an inverting voltage defined in relation to the first voltage signal, and a buffer that recovers the read data by buffering the data pulse signal.

Certain embodiments of the inventive concept provide a method for receiving a read signal using a Radio Frequency IDentification (RFID) tag within an RFID system, the method comprising; generating a first voltage signal from a received read signal, generating a second voltage signal from the received read signal, the second voltage signal having a voltage difference from the first voltage signal, generating an inverting voltage in response to the first voltage signal, obtaining a data pulse signal from inverting the second voltage signal using the inverting voltage, and recovering read data by buffering the data pulse signal.

BRIEF DESCRIPTION OF THE DRAWINGS

The accompanying drawings are included to provide a further understanding of the inventive concept, and are incorporated in and constitute a part of this specification. The drawings illustrate exemplary embodiments of the inventive concept and, together with the description, serve to explain principles of the inventive concept. In the drawings.

DETAILED DESCRIPTION

Figure 1:
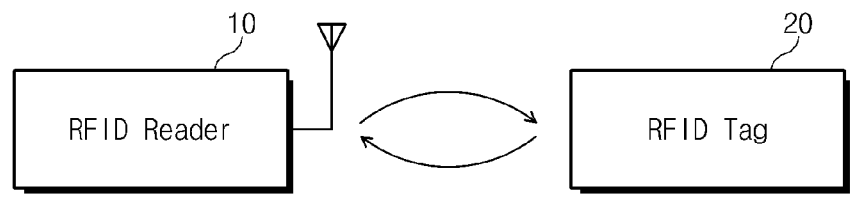
FIG. 1 is a general block diagram of an RFID system according to an embodiment of the inventive concept.

Certain embodiments of the inventive concept will now be described in some additional detail with reference to the accompanying drawings. Advantages and features of the inventive concept, and implementation methods thereof will be clarified through the following embodiments described with reference to the accompanying drawings. The inventive concept may, however, be embodied in different forms and should not be construed as being limited to only the illustrated embodiments. Rather, these embodiments are provided so that this disclosure will be thorough and complete, and will fully convey the scope of the inventive concept to those skilled in the art.

In the drawings, some features may be exaggerated for clarity of illustration and are not limited to illustrated specific shapes. Throughout the specification, like reference numbers and labels are used to denote like or similar elements.

As used herein, the term "and/or" includes any and all combinations of one or more of the associated listed items. Also, when one part (or element, device, etc.) is referred to as being "connected/coupled" to another part (or element, device, etc.), it should be understood that the former may be "directly connected" to the latter, or "indirectly connected" to the latter through at least one intervening part (or element, device, etc.). The terms of a singular form may include a plural form unless otherwise specified. Also, the meaning of "include", "comprise", "including" or "comprising" specifies a property, a region, a fixed number, a step, a process, an element and/or a component but does not exclude other properties, regions, fixed numbers, steps, processes, elements and/or components.

In various embodiments, the inventive concept provides Radio Frequency IDentification (RFID) tags having improved signal reception performance, as well as RFID readers operating in conjunction with such RFID tags, and RFID systems.

FIG. 1 is a general block diagram illustrating a RFID system according to an embodiment of the inventive concept. Referring to FIG. 1, the RFID system comprises a RFID reader 10 and a RFID tag 20. The RFID reader 10 communicates identification information with the RFID tag 20 in a contactless manner. To facilitate this communication of identification information, the RFID reader 10 transmits a "read signal" or "(RX)" at a predetermined frequency to the RFID tag 20.

The circuitry of the RFID tag 20 is activated upon receiving power (e.g., a supply voltage) derived from, or developed in response to the received read signal. RFID tags which are electrically activated only upon receipt of the read signal provided by the RFID reader 10 are referred to as a passive RFID tag. Other types of RFID tags are capable of internally generating their own power using (e.g.) an internal battery and are referred to as an active RFID tag. The description that follows assumes the use of a passive RFID tag 20 receiving power from a read signal communicated by the RFID reader 10. However, those skilled in the art will recognize that the inventive concept may be extended to RFID systems using active RFID tags.

When receiving a read signal (RX) provided from the RFID reader 10, the RFID tag 20 activates using supply voltage derived from the read signal and begins RF signal processing.

Figure 2:
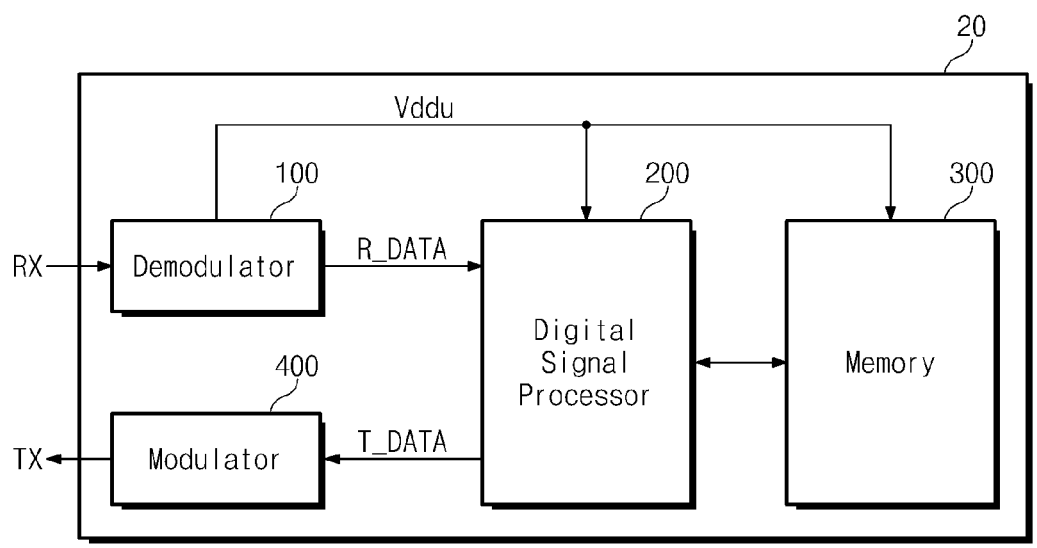
FIG. 2 is a block diagram further illustrating one example of the RFID tag of FIG. 1.

FIG. 2 is a block diagram further illustrating the RFID tag of FIG. 1. Referring to FIG. 2, the RFID tag 20 comprises; a demodulator 100, a digital signal processor 200, a memory 300, and a modulator 400.

The demodulator 100 receives the read signal (and possibly other types of control signals provided by the RFID reader) and generates a supply voltage (Vddu) which is essentially derived in the passive RFID tag from the RF energy of the received read signal. The supply voltage Vddu is then applied to other circuitry of the RFID tag including (e.g.,) the digital signal processor 200 and memory 300. The read signal (and/or related control signals communicated by the RFID reader 10) includes certain read data (R_DATA) obtained from the read signal by the demodulator 100 and provided to the digital signal processor 200.

In the illustrated embodiment of FIG. 2, the digital signal processor 200 is assumed to include a conventionally understood reference clock generator and central processing unit (not shown). The digital signal processor 200 processes the read data (R_DATA) into a digital signal, and generates certain transmit data (T_DATA) including the identification information sought by the RFIF reader 10. Throughout the operations of receiving the read signal, generating the supply voltage, obtaining (or demodulating) the read data (R_DATA), and generating the transmit data (T_DATA), the digital signal processor 200 may use the memory 300 to read and write data, as needed. Thus, the memory 300 will receive and store data, as well as provide stored data under the control of the digital signal processor 200.

The modulator 400 receives the TX data provided by the digital signal processor 200, and uses this data to generate (e.g., modulate) a transmit signal (TX) that is returned to the RFID reader 20.

Certain embodiments of the inventive concept provide a demodulator 100 that is configured for use within the RFID tag 10. Such demodulators are better able to receive the read signal, derive a power signal from the read signal, and/or recovery the read data (R_DATA) from the read signal than conventional demodulators, particularly when the read signal is weak and/or intermittent. In the description that follows, the term "read signal" is used to denote one or more control signals and/or data signals provided by the RFID reader.

Figure 3:
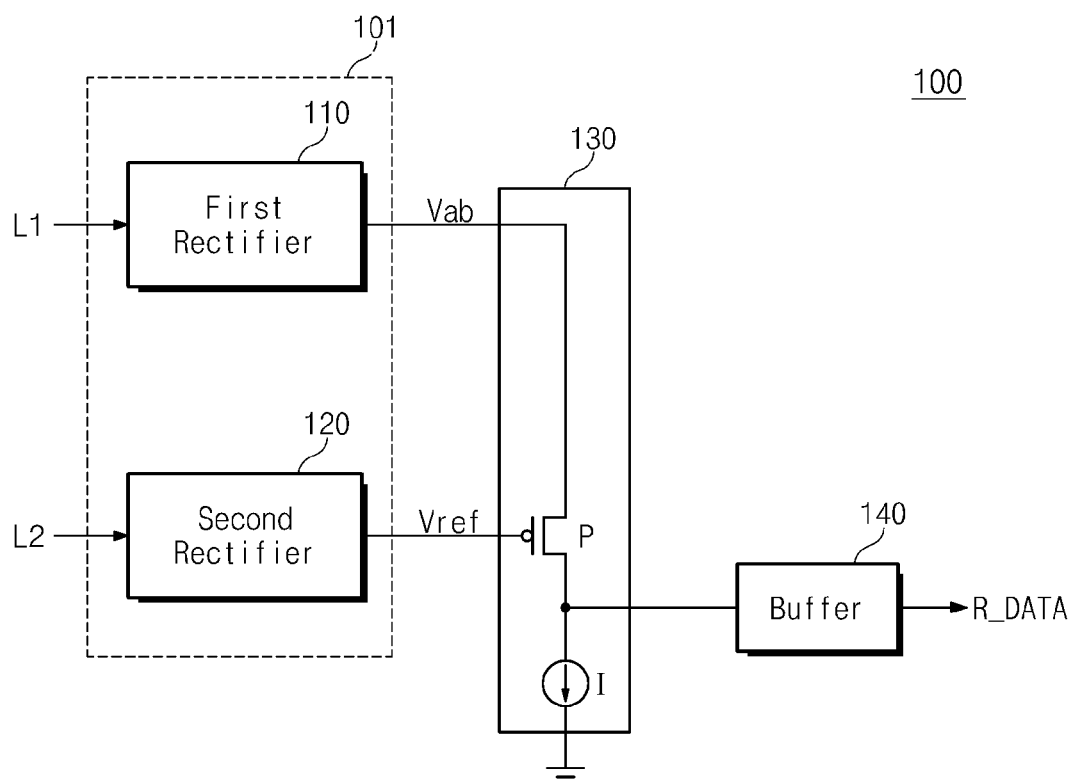
FIG. 3 is a circuit diagram illustrating one example of the demodulator of FIG. 2.

FIG. 3 is a circuit diagram illustrating one possible example of the demodulator of FIG. 2.

Referring to FIG. 3, a demodulator 100 comprises a voltage generating circuit 101 including a first envelope detector (e.g., a first rectifier) 110, a second envelope detector (e.g., a second rectifier) 120, as well as an inverter circuit 130, and a buffer circuit 140.

The first envelope detector 110 generates a first voltage signal (or supply voltage, Vab) from a first inductive signal L1 provided by an antenna of the RFID tag. The first inductive signal L1 is related to (or derived from, or induced by) the read signal (RX) as received by the antenna.

The second envelope detector 120 generates a second voltage signal (or reference voltage, Vref) from a second inductive signal L2 provided by the antenna. Here again, the second inductive signal L2 is related to (or derived from, or induced by) the read signal (RX) as received by the antenna.

The inverter 130 receives and inverts the second voltage signal Vref using an inverting voltage Vpth, and provides an output data pulse signal that effectively recovers of the read data (R_DATA) from the received read signal. Herein, the inverting voltage Vpth is a voltage for detection of the data pulse, which is formed on the basis of the first voltage signal Vab. In the illustrated embodiment of FIG. 3, the inverter 130 includes a PMOS transistor P and a current source I.

The source of the PMOS transistor P is connected to the supply voltage Vab provided by the first envelop detector 110, the gate of the PMOS transistor P is connected to the reference voltage Vref, and the drain of the PMOS transistor P is connected to the current source I and provide the read data (R_DATA).

In the particular embodiment of FIG. 3, the current source I is connected between ground and the drain of the PMOS transistor P.

With this configuration, the PMOS transistor P inverts the received second voltage signal Vref on the basis of the inverting voltage Vpth formed by the PMOS transistor P. Thus, the inverting operation performed by the PMOS transistor P outputs a data pulse from its drain.

The buffer 140 performs a buffering operation on the received read data. That is, the buffer 140 stores (or queues) data pulses provided from the inverter 130 to yield the digital read data (R_DATA), The embodiment of the inventive concept illustrated in FIG. 3 generates the inverting voltage Vpth in the inverter 130 on the basis of the first voltage signal Vab acquired from the read signal. Thus, the inverting voltage Vpth inverting the second voltage signal Vref in the inverter 130 has a voltage difference Vth(P) formed by the PMOS transistor P on the basis of the first voltage signal Vab.

The first voltage signal Vab is acquired from the read signal (RX). Therefore, the strength of the first voltage signal Vab changes with the strength of the read signal. Thus, the level of the inverting voltage Vpth generated on the basis of the first voltage signal Vab changes according to the strength of the read signal.

According to the demodulator of FIG. 3, the inverting voltage Vpth for recovery of the read data (R_DATA) changes according to the strength of the read signal (RX). Thus, the RFID tag 20 according to the illustrated embodiment of the inventive concept can prevent the signal reception performance degradation caused by changes in the strength of the read signal as provided by the RFID reader 10.

Figure 4:
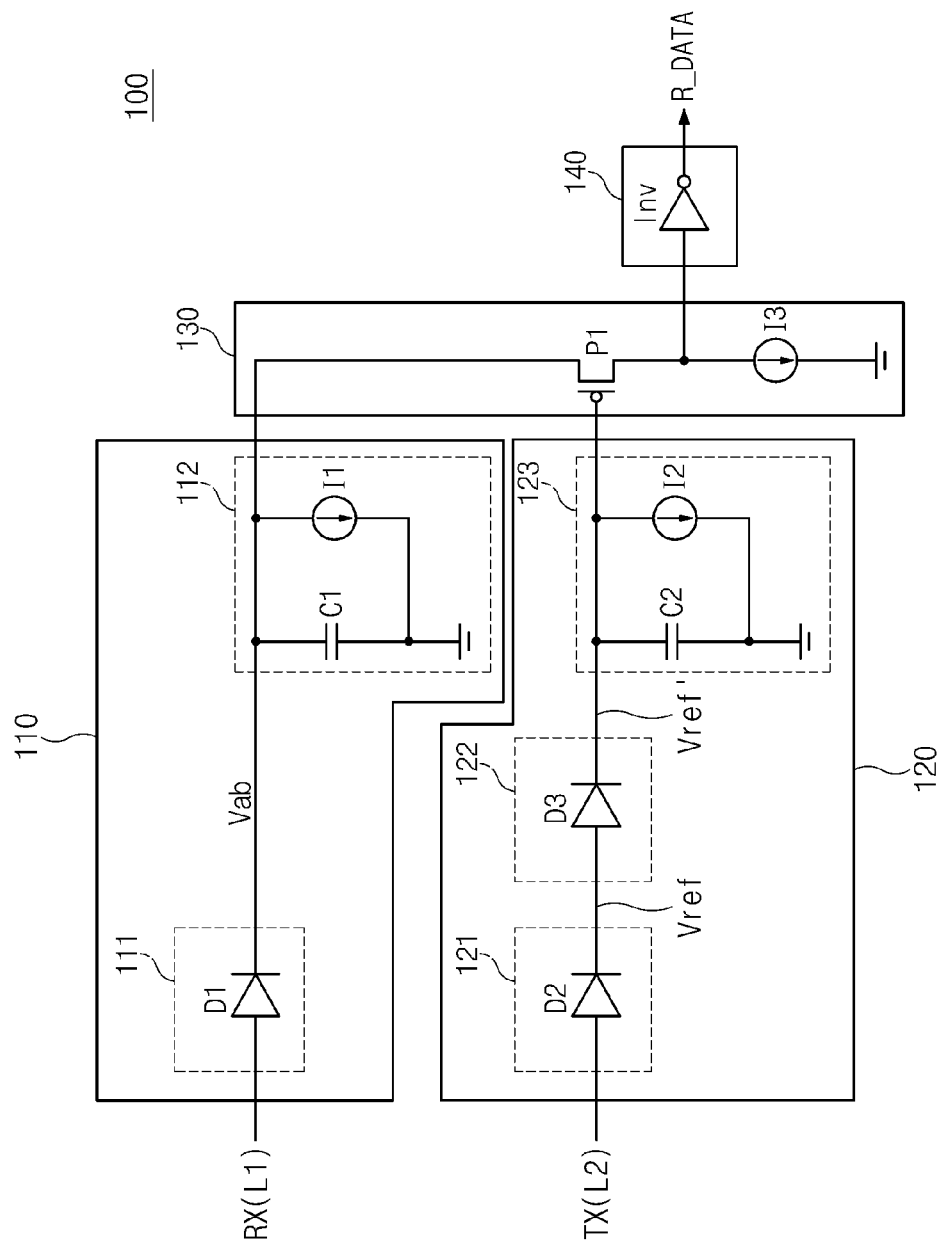
FIG. 4 is a circuit diagram illustrating another example of the demodulator of FIG. 2.

FIG. 4 is a diagram illustrating another possible embodiment of the demodulator of FIG. 2.

Referring to FIG. 4, the demodulator 100 again generally comprises a first envelope detector 110, a second envelope detector 120, an inverter 130, and a buffer 140.

However, the first envelope detector 110 of FIG. 4 comprises a first rectifier 111 and a first low-pass filter (LPF) 112. The first rectifier 111 in the illustrated example may be implemented using a first diode D1 and may be used to generate the first voltage signal Vab from the received read signal (RX) or an inductive signal (e.g., L1) derived from the read signal. In its operation, the first diode D1 may simply convert a periodic read signal into a corresponding DC signal.

The first LPF 112 in the illustrated example comprises a first capacitor C1 and a first current source I1. The first capacitor C1 and the first current source I1 are connected in parallel between the first voltage signal Vab and ground. The first capacitor C1 and the first current source I0 are configured to low-pass filter the first voltage signal Vab. The first LPF 112 accordingly outputs a low-pass filtered version of the first voltage signal Vab including only the data bearing lower frequencies and removing high-frequency noise.

The second envelope detector 120 in the illustrated example comprises a second rectifier 121, a voltage difference generator 122, and a second low-pass filter (LPF) 123.

The second rectifier 121 may be implemented using a second diode D2, and may be used to D2 generate the second voltage signal Vref from the received read signal (RX) or an inductive signal (e.g., L2) derived from the read signal. In its operation, the second diode D2 may simply convert a periodic read signal into a corresponding DC signal.

The voltage difference generator 122 may be implemented using a third diode D3. The third diode D3 receives the second voltage signal and generates a threshold adjusted third voltage signal Vref' having a voltage difference Vth(D3) with the second voltage signal Vref, such that Vref'=Vref−Vth(D3).

In the illustrated example, the second LPF 123 includes a second capacitor C2 and a second current source I2. The second capacitor C2 and the second current source I2 are connected in parallel between the third voltage signal Vref' and ground. The second capacitor C2 and the second current source I2 are configured to low-pass filter the third voltage signal Vref'. The second LPF 123 outputs a low-passed version of the third voltage signal Vref' including only the necessary low-frequency signal components. In one more particular embodiment, the second current source I2 has a larger size than the first current source I1.

The first envelope detector 110 and the second envelope detector 120 respectively output a low-passed version of the first voltage signal Vab and a low-passed version of the third voltage signal Vref' to the inverter 130.

As before, the inverter 130 comprises a PMOS transistor P1 and a (third) current source I3. The source of the PMOS transistor P1 receives the low-passed version of the first voltage signal Vab, the gate receives the low-passed version of the third voltage signal Vref', and the drain is connected to the third current source I3 and outputs demodulated pulse signals to buffer 140.

In the illustrated example of FIG. 4, the third current source I3 is connected between ground and the drain of the PMOS transistor P1. Hence, the PMOS transistor P1 inverts the low-passed version of the third voltage signal Vref' by the inverting voltage Vpth formed by the threshold voltage Vth (P1) of the PMOS transistor P1 on the basis of the first voltage signal Vab, and the PMOS transistor P1 outputs a data pulse to the buffer 140.

The buffer 140 may include an inverter (Inv). As before, the inverter may be used to recover the read data (R_DATA) obtained from the read signal by the demodulator 100, as indicated by the data pulses provided by the inverter 130. The read data (R_DATA) provided by the inverter Inv of the buffer 140 may thus be provided to downstream circuitry in a proper digital data format.

With this configuration, the demodulator 100 of FIG. 4 recovers the read data (R_DATA) using an inverting voltage Vpth that changes with changes in the strength of the received read signal (RX), thereby inhibiting signal reception degradation due to changes in the strength of the read signal.

Figure 5:
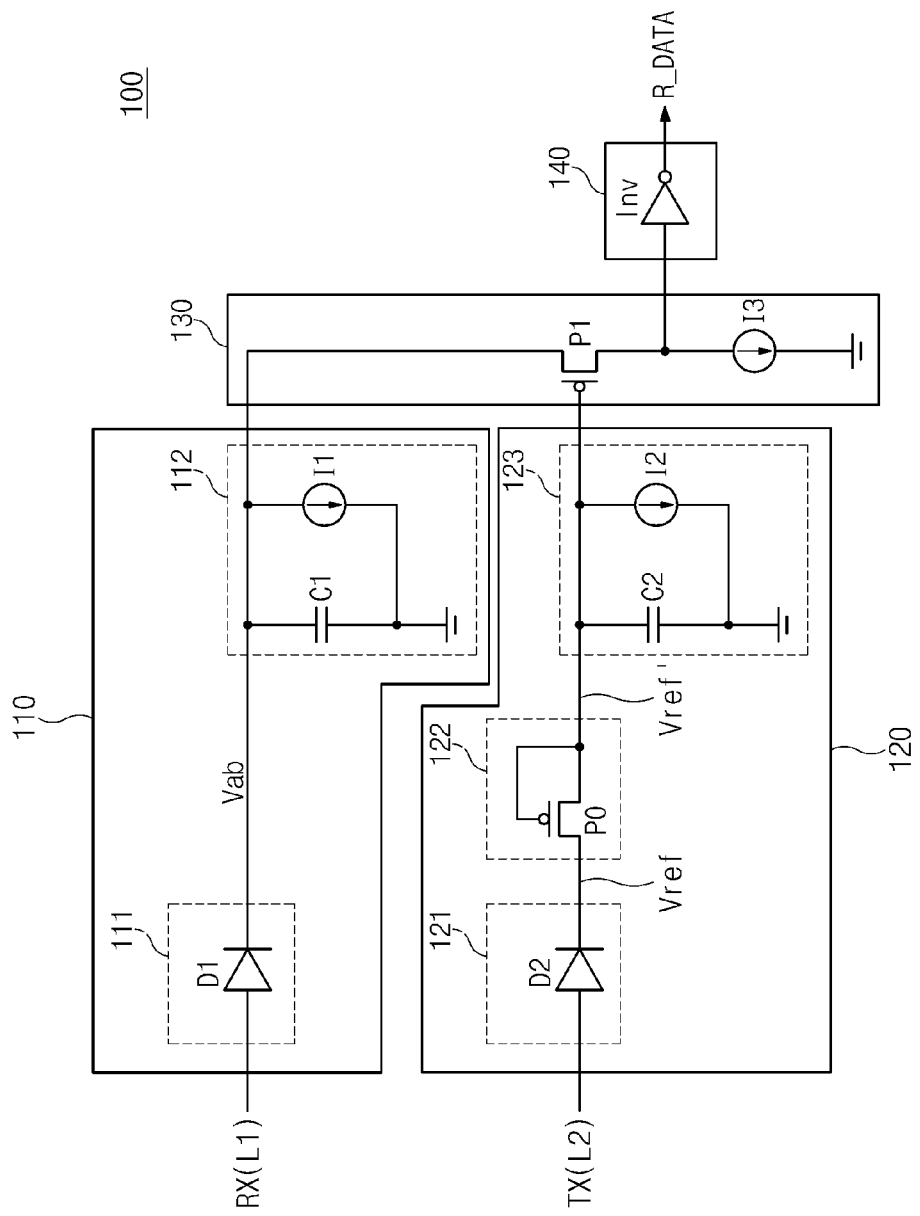
FIG. 5 is a circuit diagram illustrating yet another example of the demodulator of FIG. 2.

FIG. 5 is a diagram illustrating yet another embodiment of the demodulator of FIG. 2.

Referring to FIG. 5, the demodulator 100 comprises the same first envelope detector 110, inverter 130, and buffer 140 as described above in relation to FIG. 4. More particularly, the third diode D3 used to implement the voltage difference generator 122 is replaced by a PMOS transistor P0, wherein the source of the PMOS transistor P0 receives the second voltage signal Vref, and the gate and drain of the PMOS transistor P0 are connected to each other. With this configuration, the PMOS transistor P0 may be referred to as a diode connected transistor. However, the diode connected PMOS transistor P0 performs essentially the same function as the third diode D3 of the embodiment of FIG. 4. Namely, it reduces the level of the second voltage signal Vref by a defined threshold voltage value. Thus, the diode connected PMOS transistor P0 generates the third voltage signal Vref' having a voltage difference Vth(P0) with the first voltage signal Vab or Vref'=Vref−Vth (P0). It should be noted that in the foregoing embodiments the first voltage signal Vab and the second voltage signal Vref may be equal, or they may be different.

Figure 6:
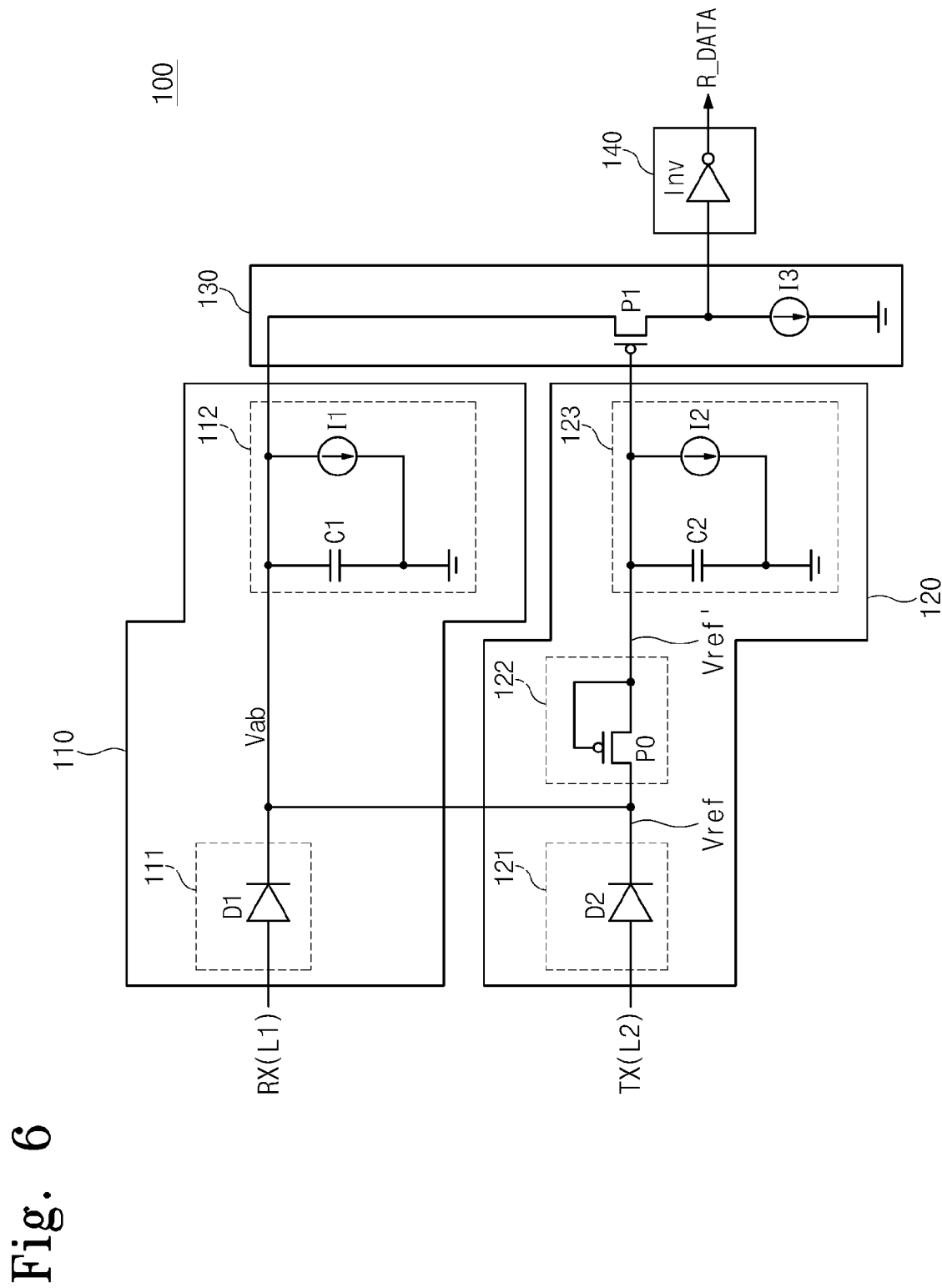
FIG. 6 is a circuit diagram illustrating still another example of the demodulator of FIG. 2.

FIG. 6 is a diagram illustrating still another possible embodiment for the demodulator of FIG. 2.

The demodulator shown in FIG. 6 is structurally similar to that of the embodiment of FIG. 5, except the respective outputs of the first rectifier of the first envelope detector 110 and second rectifier of the second envelope detector 120 are commonly connected.

Accordingly, the first voltage signal Vab and the second voltage signal Vref are equalized to the same voltage level before passing respectively to the first LPF 112 and the voltage difference generator 122. This reference voltage signal equalization tends to further reduce the incidence of signal recovery error occurring between the first voltage signal Vab and the threshold adjusted second voltage signal Vref'. That is, the possibility of error caused by operation of the current sources I1 and I2 in the LPFs 112 and 123 may be reduced by the illustrated connection between the first envelope detector 110 and the second envelope detector 120.

Figure 7:
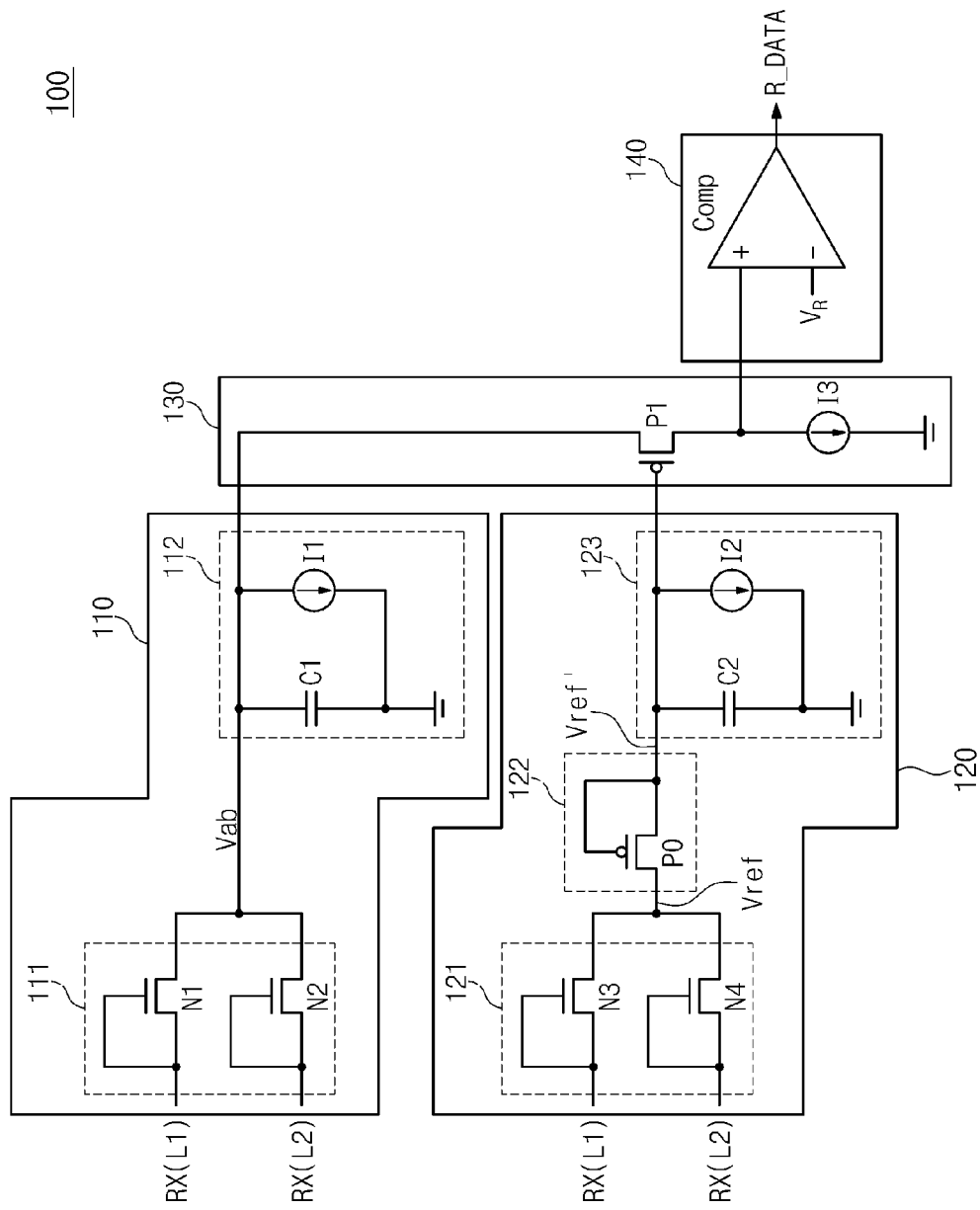
FIG. 7 is a circuit diagram illustrating still another example of the demodulator of FIG. 2.

FIG. 7 is a diagram illustrating still another possible embodiment for the demodulator of FIG. 2. Referring to FIG. 7, the demodulator 100 has essentially the same structure as the demodulator of FIG. 5, except the first diode D1 of the first rectifier 111 is replaced with parallel connected NMOS transistors N1 and N2, the second diode D1 of the second rectifier 121 is replaced with parallel connected NMOS transistors N3 and N4. Further the inverter (Inv) of the buffer 140 is replaced by a differential comparator (Comp).

Thus, the first rectifier 111 includes a first NMOS transistor N1 and a second NMOS transistor N2. The first NMOS transistor N1 outputs a first detection signal derived from the read signal RX or an inductive signal (L1) indicative of the read signal. The source of the first NMOS transistor N1 receives the read signal (RX or L1), and the drain outputs a first detection signal. The source and the gate of the first NMOS transistor N1 are connected to each other. The second NMOS transistor N2 similarly outputs a second detection signal derived from the read signal (RX or L2). The source of the second NMOS transistor N2 receives the read signal (RX or L2) and the drain outputs the second detection signal. The source and the gate of the second NMOS transistor N2 are connected to each other.

The first rectifier 111 combines the first detection signal provided by the first NMOS transistor N1 and the second detection signal provided by the second NMOS transistor N2 to generate the first voltage signal Vab. The first rectifier 111 may include a combiner (not illustrated) for combining the first and second detection signals.

In similar vein, the second rectifier 121 includes a third NMOS transistor N3 and a fourth NMOS transistor N4. The third NMOS transistor N3 outputs a third detection signal derived from the read signal RX or an inductive signal (L1) indicative of the read signal. The source of the third NMOS transistor N3 receives the read signal (RX or L1), and the drain outputs a third detection signal. The source and the gate of the third NMOS transistor N3 are connected to each other. The fourth NMOS transistor N4 similarly outputs a fourth detection signal derived from the read signal (RX or L2). The source of the fourth NMOS transistor N4 receives the read signal (RX or L2), and the drain outputs the fourth detection signal. The source and the gate of the fourth NMOS transistor N4 are connected to each other.

The second rectifier 121 combines the third detection signal provided by the third NMOS transistor N3 and the fourth detection signal provided by the fourth NMOS transistor N4 to generate the second voltage signal Vref. The second rectifier 121 may include a combiner (not illustrated) for combining the first and second detection signals.

In the embodiment of FIG. 7, the buffer 140 comprises a differential comparator (Comp). The differential comparator (Comp) receives at one terminal (e.g., the positive terminal in the illustrated example) the data pulse provided by the inverter 130 and the reference voltage $V_R$ at another terminal (e.g., the negative terminal in the illustrated example). If the data pulse received by the comparator Comp is less than the reference voltage $V_R$, the output of the amplifier becomes the maximum minus (−) level. If, however, the data pulse received by the comparator Comp is greater than the reference voltage $V_R$, the output of the amplifier becomes the maximum plus (−) level.

Thus, the read data (R_DATA) provided by the differential comparator Comp (or a similarly operating differential amplifier) not only output in the proper digital data format, but may be output with a maximum high/low data voltage difference.

Figure 8:
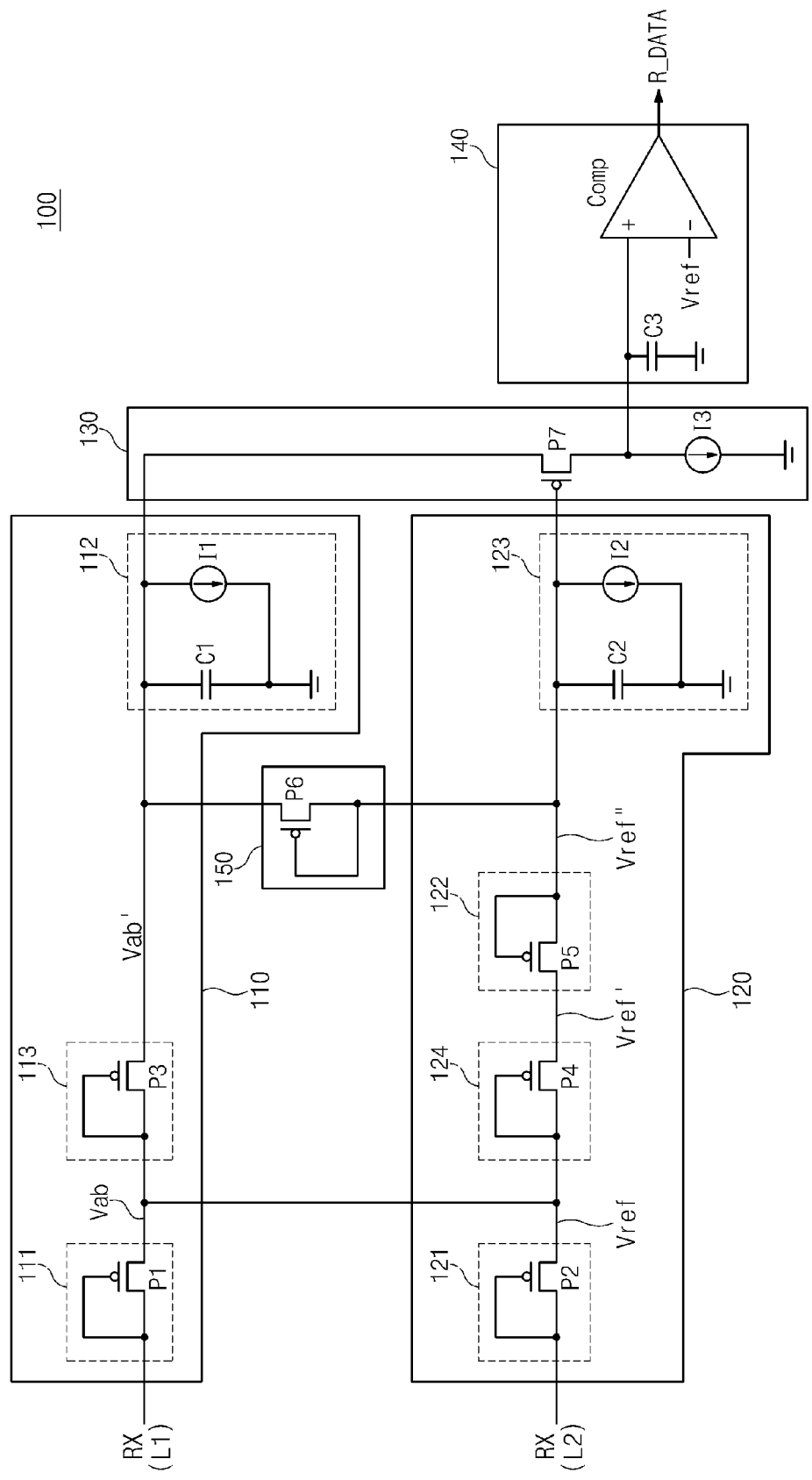
FIG. 8 is a circuit diagram illustrating still example of the demodulator of FIG. 2.

FIG. 8 is a diagram of still another possible embodiment for the demodulator of FIG. 2.

Referring to FIG. 8, the demodulator 100 comprises a first envelope detector 110, a second envelope detector 120, an inverter 130, a buffer 140, and a level controller 150.

The first envelope detector 110 comprises a first rectifier 111, a second rectifier 113, and a first low-pass filter (LPF) 112. The first rectifier 111 may be implemented using a first PMOS transistor P1 providing the first voltage signal Vab, as derived from the received read signal RX. The source and gate of the first PMOS transistor P1 are connected (e.g., diode-connected). The first PMOS transistor P1 essentially converts a periodic read signal (RX or L1) into a corresponding DC signal.

The second rectifier 113 may be implemented using a second PMOS transistor P2. The second P transistor P2 generates a threshold adjusted version of the first voltage signal Vab' from the first voltage signal Vab. Here again, the source and gate of the second PMOS transistor P2 are connected (e.g., diode-connected).

The first LPF 112 comprises a first capacitor C1 and a first current source I1. The first capacitor C1 and the first current source I1 are connected in parallel between the threshold adjusted version of the first voltage signal Vab' and ground. The first capacitor C1 and the first current source I1 are configured to low-pass filter the second voltage signal Vab. The first LPF 112 outputs a low-passed version of the threshold adjusted version of the first voltage signal Vab' including only necessary low-frequency signal components.

The second envelope detector 120 comprises a third rectifier 121, a fourth rectifier 124, a voltage difference generator 122, and a second low-pass filter (LPF) 123.

The third rectifier 121 may be implemented using a third PMOS transistor P3 to generate the second voltage signal Vref from the received read signal (RX or L2). The source and gate of the third PMOS transistor P3 are connected (e.g., diode-connected). The third PMOS transistor P3 essentially converts the periodic read signal (RX or L2) into a corresponding DC signal.

The fourth rectifier 124 may be implemented using a fourth PMOS transistor P4. The fourth PMOS transistor P4 provides a threshold adjusted version of the second voltage signal Vref' from the second voltage signal Vref. The source and gate of the fourth PMOS transistor P4 are connected (e.g., diode-connected).

The voltage difference generator 122 comprises a fifth PMOS transistor P5. The source of the fifth PMOS transistor P5 is connected to the fourth rectifier 124, and the gate and drain of the fifth PMOS transistor P5 are diode connected. Upon receiving the threshold adjusted version of the second voltage signal Vref', the fifth PMOS transistor P5 generates a further adjusted second voltage signal Vref" having a voltage difference Vth with the threshold adjusted version of the second voltage signal Vref' or Vref"=Vref'−Vth.

The second LPF 123 comprises a second capacitor C2 and a second current source I2. The second capacitor C2 and the second current source I2 are connected in parallel between the further adjusted version of the second voltage signal Vref" and ground. The second capacitor C2 and the second current source I2 are configured to low-pass filter the further adjusted second voltage signal Vref". The second LPF 123 outputs a low-pass filtered version of the further adjusted second voltage signal Vref" including only a necessary low-frequency signal components. In certain embodiment of the inventive concept, the second current source I2 may be larger than the first current source I1.

A contact point between the first rectifier 111 and the second rectifier 113 may be connected to a corresponding contact point between the third rectifier 121 and the fourth rectifier 124 to equalize the first voltage signal Vab and the second voltage signal Vref with the salutary effects noted above.

The inverter 130 comprises a seventh PMOS transistor P7 and a third current source I3. The source of the seventh PMOS transistor P7 receives the output of the first low-pass filter 112, the gate receives the output of the second low-pass filter 123, and the drain is connected to the third current source I3. In the illustrated example, the third current source I3 is connected between ground and the drain of the seventh PMOS transistor P7.

With this configuration, the seventh second PMOS transistor P7 inverts the low-pass filtered, threshold adjusted version of the first voltage signal Vab' by the inverting voltage Vpth formed by the threshold voltage Vth(P7) of the seventh PMOS transistor P7 on the basis of the first voltage signal Vab. The seventh PMOS transistor P7 outputs a data pulse through the drain.

As described above in relation to FIG. 7, the buffer 140 may include a differential comparator (Comp). However, with the embodiment shown in FIG. 8 the buffer 140 also comprises a filtering capacitor C3 connected between the terminal receiving the data pulse (e.g., the positive terminal) of the differential comparator (Comp) and ground. The third capacitor C3 may remove noise (e.g., a voltage ripple) and improve the quality of the detected read data (R_DATA).

The level controller 150 comprises a sixth diode connected PMOS transistor P6. The source of the sixth PMOS transistor P6 is connected to the output of the voltage difference generator 122 and the drain of the sixth PMOS transistor P6 is connected to the output of the second rectifier 113.

With this configuration, the sixth PMOS transistor P6 has a threshold voltage Vth(P6) defining a turn-ON operation. If the difference between the threshold adjusted version of the first voltage signal Vab' and the further adjusted version of the second voltage signal Vref'' is greater than the threshold voltage Vth(P6), the sixth PMOS transistor P6 is turned ON to equalize the level between these two voltage signals. On the other hand, if the difference between the threshold adjusted version of the first voltage signal Vab' and the further adjusted version of the second voltage signal Vref'' is less than the threshold voltage Vth(P6), the sixth PMOS transistor P6 remains OFF.

Figure 9:
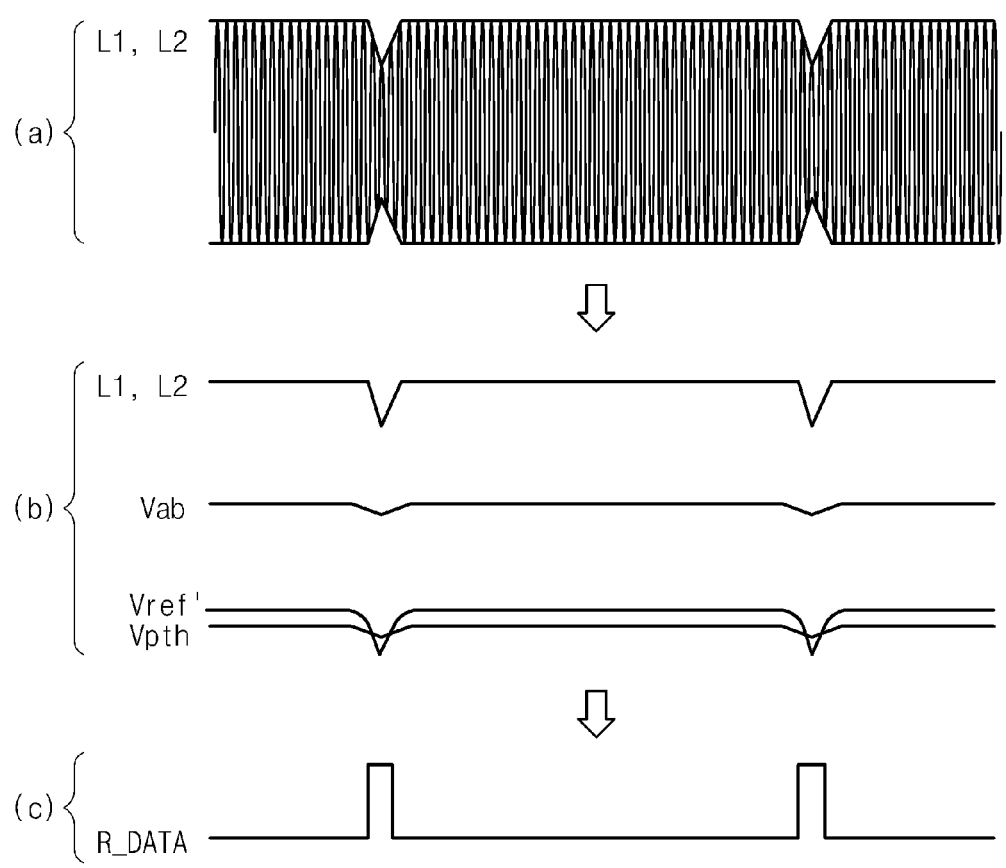
FIG. 9, inclusive of FIGS. 9($a$), 9($b$) and 9($c$), is a graph illustrating an RX signal recovery operation performed by a demodulator according to an embodiment of the inventive concept.

FIG. 9, inclusive of FIGS. 9(a), 9(b) and 9(c), is a graph illustrating an exemplary read signal (RX) recovery operation for a demodulator according to an embodiment of the inventive concept.

Referring to FIG. 9, the following description is made in the context of a read signal recovery operation for the demodulator 100 of FIG. 4.

FIG. 9(a) illustrates equal first and second inductive signals L1 and L2 derived from a received read signal RX by an antenna in the RFID tag.

The first envelope detector 110 generates a low-pass filtered version of the first voltage signal Vab from the first inductive signal L1. The second envelope detector 120 generates a low-pass filtered, threshold adjusted version of the second voltage signal Vref' from the second inductive signal L2. That is, the second envelope detector 120 subtracts a threshold voltage difference Vth(D3) using the voltage difference generator 122 from the second voltage signal Vref to generate Vref'.

The inverter 130 inverts the low-pass filtered, threshold adjusted version of the second voltage signal Vref' using an inverting voltage Vpth formed by the threshold voltage Vth(P1) of the PMOS transistor P1 on the basis of the low-pass filtered version first voltage signal Vab.

Thus, the first voltage signal Vab, the low passed, threshold adjusted version of the second voltage signal Vref, and the inverting voltage Vpth have the following relationships:

$Vab = L1 - Vth(D1) = L2 - Vth(D1)$ $Vref = L1 - Vth(D2) - Vth(D3) = L2 - Vth(D2) - Vth(D3)$ $Vpth = Vab - Vth(P)$ (1)

FIG. 9(b) illustrates the first and second inductive signals L1 and L2, the first voltage signal Vab, the low-passed filtered, threshold adjusted version of the second voltage signal Vref', and the inverting signal Vpth. In the working example, it is assumed that Vth(D1) and Vth(D2) have the same value.

Herein, the inverting voltage Vpth is generated on the basis of the first voltage signal Vab. The strength of the first voltage signal Vab as defined by the received strength of the read signal RX and correspondingly derived signals (e.g.,) L1 and L2. Thus, it is possible to inhibit signal reception degradation due to reduction in the strength of the read signal.

The buffer 140 buffers the received data pulse according to the inverting operation performed on the low-pass, threshold adjusted version of the third voltage signal Vref' by the inverter 130. The buffer 140 recovers the digital read data (R_DATA) through the buffering operation.

FIG. 9(c) illustrates the recovered digital read data (R_DATA).

A demodulator according various embodiments of the inventive concept can effectively recover read data (R_DATA) by the inverting voltage Vpth based on the read signal strength using an inverter including a PMOS transistor and the current source.

Thus, a RFID tag according to embodiments of the inventive concept is better able to prevent the signal reception degradation due to an obstacle and/or a separation distance. Thus, a RFID system according to an embodiment of the inventive concept is able to function adequately over greater separation distances and within busy operating environments.

The above-disclosed subject matter is to be considered illustrative and not restrictive, and the appended claims are intended to cover all such modifications, enhancements, and other embodiments, which fall within the scope of the inventive concept. Thus, to the maximum extent allowed by law, the scope of the inventive concept is to be determined by the broadest permissible interpretation of the following claims and their equivalents, and shall not be restricted or limited by the foregoing detailed description.

What is claimed is:

1. A Radio Frequency IDentification (RFID) tag comprising:
    a demodulator that receives a read signal containing read data, wherein the demodulator comprises:
        a voltage generating circuit that provides a first voltage signal and a second voltage signal derived from the received read signal;
        an inverter that provides a data pulse signal indicative of the read data by inverting the second voltage signal using an inverting voltage defined in relation to the first voltage signal; and
        a buffer that recovers the read data by buffering the data pulse signal.

2. The RFID tag of claim 1, wherein the inverter comprises a PMOS transistor having a source that receives the first voltage signal, a gate that receives the second voltage signal, and a drain providing the data pulse signal and connected to a current source.

3. The RFID tag of claim 1, wherein the voltage signal generator comprises:
    a first envelope detector that provides the first voltage signal in response to a first inductive signal derived from the received read signal; and
    a second envelope detector that provides the second voltage signal in response to a second inductive signal derived from the received read signal, wherein the second voltage signal is less than the first voltage signal by at least a defined difference voltage.

4. The RFID tag of claim 3, wherein the first envelope detector comprises:
    a first rectifier that receives the first inductive signal and provides the first voltage signal; and
    a first low-pass filter (LPF) that low-pass filters the first voltage signal before providing the first voltage signal to the inverter.

5. The RFID tag of claim 4, wherein the second envelope detector comprises:

a second rectifier that receives the second inductive signal and provides the second voltage signal;

a voltage difference generator that adjusts the second voltage signal by the voltage difference to provide an adjusted version of the second voltage signal; and a second low-pass filter (LPF) that low-pass filters the adjusted version of the second voltage signal before providing a low-pass filtered, adjusted version of the second voltage signal to the inverter.

6. The RFID tag of claim 5, wherein the voltage difference generator is a diode.

7. The RFID tag of claim 6, wherein the diode is a diode connected transistor.

8. The RFID tag of claim 5, further comprising:
an electrical connection between an output of the first rectifier and an output of the second rectifier equalizing the first voltage signal and the second voltage signal.

9. The RFID tag of claim 5, wherein the first rectifier comprises a first NMOS transistor providing a first detection signal derived from the first inductive signal, and a second NMOS transistor providing a second detection signal derived from the second inductive signal.

10. The RFID tag of claim 9, wherein the second rectifier comprises a third NMOS transistor providing a third detection signal derived from the first inductive signal, and a fourth NMOS transistor providing a fourth detection signal derived from the second inductive signal.

11. The RFID tag of claim 5, wherein the buffer comprises a differential comparator that receives the pulse data signal and a reference signal and provides the read data.

12. The RFID of claim 3, wherein the first envelope detector comprises:
a first rectifier that provides the first voltage signal;
a second rectifier that provides an adjusted version of the first voltage signal; and
a first low-pass filter that low-pass filters the adjusted version of the first voltage signal and provides a low-pass filtered adjusted version of the first voltage signal to the inverter; and the second envelope detector comprises:
a third rectifier that provides the second voltage signal;
a fourth rectifier that provides an adjusted version of the second voltage signal;
a voltage difference generator that provides a further adjusted version of the second voltage signal; and
a second low-pass filter that low-pass filters the further adjusted version of the second voltage signal and provides a low-pass filtered further adjusted version of the second voltage signal to the inverter.

13. The RFID tag of claim 12, further comprising:
a level controller connected between an output of the second rectifier and an output of the voltage difference generator.

14. The RFID tag of claim 13, wherein the voltage difference generator comprises at least one of a diode-connected PMOS transistor providing the difference voltage.

15. The RFID tag of claim 1, wherein the buffer comprises an inverter that inverts the data pulse signal to recover the read data.

16. A method for receiving a read signal using a Radio Frequency IDentification (RFID) tag within an RFID system, the method comprising:
generating a first voltage signal from a received read signal;
generating a second voltage signal from the received read signal, the second voltage signal having a voltage difference from the first voltage signal;
generating an inverting voltage in response to the first voltage signal;
obtaining a data pulse signal from inverting the second voltage signal using the inverting voltage; and
recovering read data by buffering the data pulse signal.

17. The method of claim 16, further comprising:
reducing a voltage level between the first voltage signal and the second voltage signal if equal to or greater than a reference voltage difference.

18. The method of claim 16, wherein the recovering of the read data comprises removing a noise signal from the data pulse signal.

19. The method of claim 16, wherein the generating of the second voltage signal comprises:
adjusting a level of the second voltage signal by the voltage difference; and
low-pass filtering the adjusted second voltage signal.

20. The method of claim 19, wherein the second voltage signal is equal to the first voltage signal.

* * * * *